United States Patent [19]

Dienbauer

[11] Patent Number: 5,341,257
[45] Date of Patent: Aug. 23, 1994

[54] HEAD CLEANING DEVICE FOR MAGNETIC TAPE CASSETTE APPARATUS HAVING A ROTATING HEAD

[75] Inventor: Josef Dienbauer, Mönichkirchen, Austria

[73] Assignee: U.S. Philips Corporation, New York, N.Y.

[21] Appl. No.: 838,384

[22] Filed: Feb. 19, 1992

[30] Foreign Application Priority Data

Mar. 18, 1991 [AT] Austria ............................ A 604/91

[51] Int. Cl.$^5$ .............................................. G11B 5/41
[52] U.S. Cl. ........................................ 360/85; 360/128
[58] Field of Search ................................. 360/128, 85

[56] References Cited

U.S. PATENT DOCUMENTS 5,182,691   1/1993   Mimasu ..................... 360/128

FOREIGN PATENT DOCUMENTS

63-140443   6/1988   Japan ......................... 360/128

Primary Examiner—A. J. Heinz
Attorney, Agent, or Firm—William L. Botjer

[57] ABSTRACT

An apparatus (1) comprises at least one rotatable magnetic head (78, 79) for recording and reproducing signals on/from a magnetic tape (24) accommodated in a cassette (2), a cassette holder (10), a tape-threading device (47) by means of which the magnetic tape (24) can be brought into scanning contact with the magnetic head (78, 79), and a head-cleaning device (61), which comprises an actuating member (62). In this apparatus the actuating member (62) of the head-cleaning device (61) is arranged and constructed to project into the path of movement of the unit formed by the cassette holder (10) and a cassette (2) which may have been inserted therein.

3 Claims, 5 Drawing Sheets

HEAD CLEANING DEVICE FOR MAGNETIC TAPE CASSETTE APPARATUS HAVING A ROTATING HEAD

BACKGROUND OF THE INVENTION

The invention relates to an apparatus for recording and reproducing signals on a magnetic tape accommodated in a cassette by means of a scanning device comprising at least one rotatable magnetic head moving along a circular path for scanning the magnetic tape in order to record and reproduce the signals, the apparatus comprising a cassette holder, which is movable between a loading position and an operating position for cooperation with the magnetic tape, into which holder in the loading position thereof the magnetic tape in the cassette can be inserted in an initial position and by means of which holder by its movement into the operating position the magnetic tape can be brought in an intermediate position, and a tape-threading device, which is adapted to cooperate with the magnetic tape and is movable between a thread-out position and a thread-in position, which tape-threading device in its thread-out position is engageable behind the magnetic tape which has been brought into its intermediate position and by means of which upon engagement as a result of the movement of said threading device to the thread-in position the magnetic tape can be arranged along a scanning path in which the magnetic tape is wrapped at least partly around the scanning device and can be scanned by the magnetic head, and a head-cleaning device which is movable between a rest position and a cleaning position, which cleaning device is urged to its rest position by a spring means and comprises an actuating member by means of which, as a result of the actuation of an afore-mentioned device for cooperation with the magnetic tape, the head-cleaning device is movable from its rest position into its cleaning position against the force of the spring means, in which cleaning position it has been moved towards the path of the magnetic head and cleans the magnetic head moving past it.

Such apparatuses are commercially available in different versions. Such an apparatus of the type defined in the opening paragraph is known from, for example, the Japanese Patent Application filed under number 63-111.223 and published under number 1-282.716 on Nov. 14, 1989. In this prior-art apparatus the construction is such that the actuating member of the head-cleaning device projects into the path of movement of a part of the tape-threading device which has been provided for cooperation with the magnetic tape and is consequently controlled by this part of the tape-threading device. Such a tape-threading device is a mechanically comparatively vulnerable assembly of such an apparatus, which should be subjected only to minimal mechanical loads. Moreover, with the prior-art apparatus it is not unlikely that in the event of a defect of the head-cleaning device this device may impair the threading operation of the threading device, which may result in undesirable tape damage.

SUMMARY OF THE INVENTION

It is the object of the invention to mitigate the above problems in an apparatus of the type defined in the opening paragraph and to provide an apparatus in which the actuation of the head-cleaning device does not cause the tape-threading device to be subjected to high loads and in which the tape cannot be damaged as a result of defects of the head-cleaning device. According to the invention this object is achieved in that the actuating device of the head-cleaning device is arranged and constructed to project into the path of movement of the unit formed by the cassette holder and a cassette which may have been inserted therein, the actuating member causing the head-cleaning device to be moved from its rest position to its cleaning position when the cassette holder is moved between its loading position and its operating position. Thus, it is achieved that the head-cleaning device is controlled in dependence upon the actuation of the cassette-holding means, which is constructed to cooperate with the magnetic tape. However, such a cassette holder constitutes a robust and mechanically insensitive assembly of such an apparatus, whose actuating movement guarantees a very reliable actuation of the head-cleaning device. As a result of the use of the actuating movement of the robust cassette holder for controlling the head-cleaning device it is also achieved that other mechanically vulnerable assemblies of the apparatus are not subjected to comparatively high mechanical loads. A further advantage is that, because the cassette holder does not cooperate directly with the magnetic tape but indirectly via the protective cassette which accommodates the magnetic tape, a defect of the head-cleaning device which occurs during the movement of the cassette holder together with the cassette inserted therein may impair this movement or may damage the cassette holder or the cassette but such a defect of the head-cleaning device cannot lead to damaging of the magnetic tape accommodated in the protective cassette.

The actuating member of the head-cleaning device can be actuated for example by a cassette inserted into the cassette-holding means. It is found to be very advantageous if the actuating member of the head-cleaning device is arranged and constructed to project into the path of movement of the cassette holder. Thus, it is achieved that a movement of the head-cleaning device to its cleaning position is caused only by the cassette-holding means, which precludes damaging of a cassette in the case of a defect of the head-cleaning device and which ensures that the head-cleaning device is also set to its cleaning position when the cassette holder is moved between its loading position and its operating position without a cassette having been inserted said cassette-holding means.

BRIEF DESCRIPTION OF THE DRAWING

An embodiment of the invention will now be described in more detail, by way of non-limitative example, with reference to the drawings.

DETAILED DESCRIPTION OF THE PREFERRED EMBODIMENT

Figure 1:
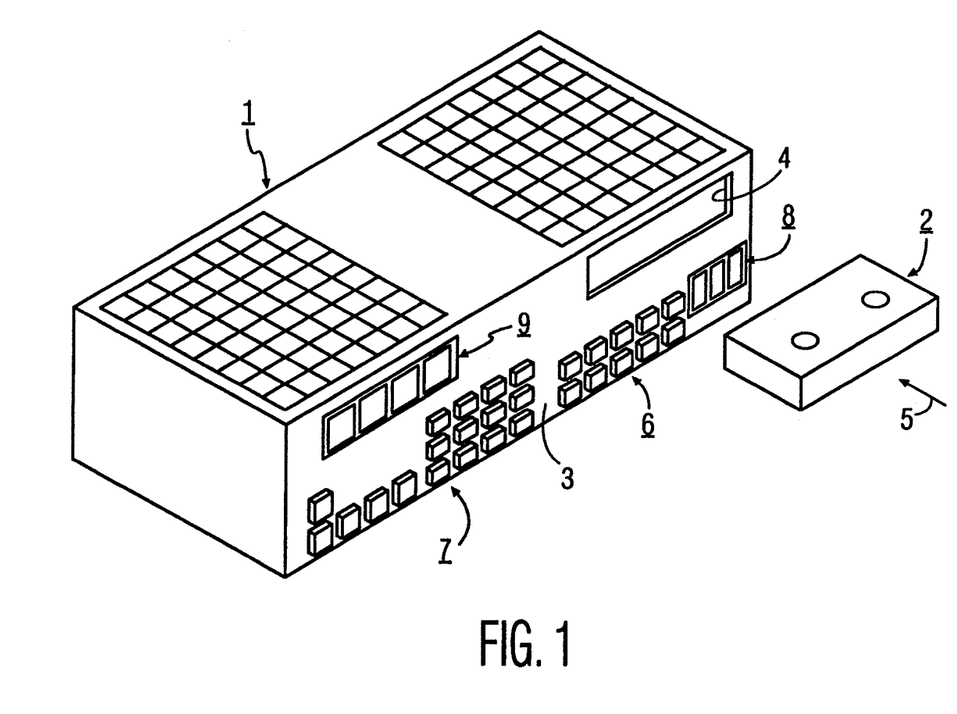
FIG. 1 is a reduced-scale diagrammatic oblique view of an apparatus for recording and reproducing television signals and audio signals, which apparatus is constructed to receive a cassette accommodating a magnetic tape and comprises a drum-shaped scanning device with two rotatable magnetic heads for scanning the magnetic tape and a movable head-cleaning device for cleaning these two magnetic heads.

FIG. 1 shows an apparatus 1 for recording and reproducing television signals and audio signals on a magnetic tape. The magnetic tape is accommodated in a cuboidal cassette 2 which is shown diagrammatically in FIG. 1 and which comprises two juxtaposed reel hubs between which the magnetic tape extends. The cassette 2 can be inserted by hand into the apparatus 1 in an insertion direction indicated by an arrow 5 through an opening 4 in the front wall 3 of the housing of the apparatus 1. When the cassette 2 is loaded into the apparatus 1 it is inserted into a movable cassette holder, whose construction will be described hereinafter. Upon complete insertion of the cassette into the apparatus 1 the cassette holder first moves the cassette parallel to the cassette main walls and then lowers it perpendicularly thereto into an operating position, shown diagrammatically in FIG. 2, inside the apparatus. For starting the modes of the apparatus, such as "recording", "normal forward reproduction", "normal reverse reproduction", "still reproduction", "fast forward", "fast reverse" and the like and for starting operating functions, such as "actuation of the cassette holder", "actuation of the tape-threading device" and the like the apparatus 1 comprises a first set 6 of controls on its front wall 3. For programming the apparatus, for starting a station-search mode in the apparatus 1 and for entering further data, for example to set a daytime clock, the apparatus 1 comprises a second set 7 of controls on the front wall 3. Moreover, at its front wall 3 the apparatus 1 comprises two display devices 8 and 9, whose displays each comprise seven segments and which serve for example for indicating the count of a tape-length measurement counter and for displaying the daytime.

Figure 2:
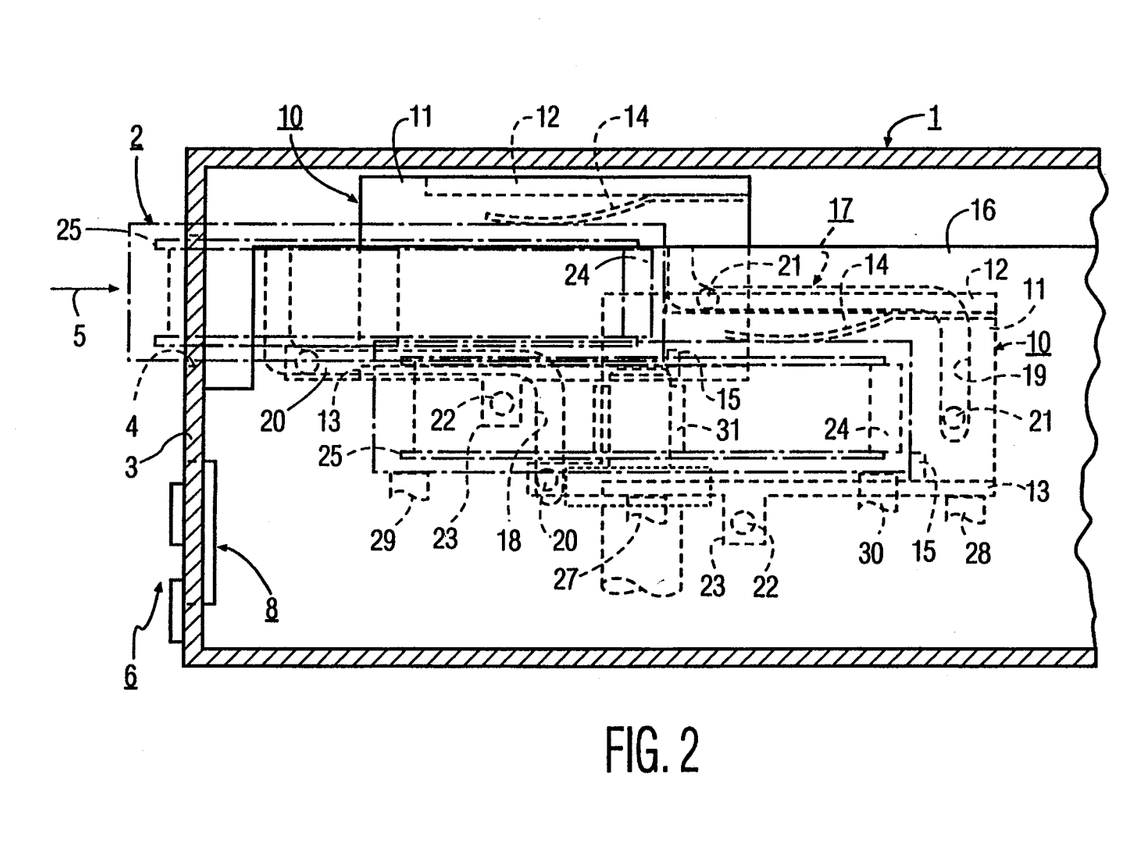
FIG. 2 shows a part of the apparatus of FIG. 1 in a diagrammatic side view to an enlarged scale in comparison with FIG. 1 and with a side wall of the apparatus housing cut away, a cassette holder of this apparatus, which holder is movable between a loading position and an operating position, being shown both in its loading position and in its operating position.

As already stated and shown in FIG. 2 the apparatus 1 comprises a movable cassette holder 10 for moving a cassette 2, which has been inserted by hand into the apparatus 1 through the opening 4 in the front wall 3, into its operating position. For such a cassette holder reference is made to AT-PS 382,979, which shows and describes such a cassette holder in detail, for which reason only a brief description of this cassette holder 10 will be given. Therefore, AT-PS 382,979 is herewith incorporated by reference.

The cassette holder 10 is substantially channel-shaped and has two side walls 11. The cassette holder 10 further comprises a continuous upper wall 12, interconnecting the two side walls 11, and two lower-wall sections 13 which are inclined from the side walls 11 towards one another. Two metal blade springs 14 are secured to the upper wall 12 by gluing or ultrasonic welding at its side facing the lower-wall sections 13. The blade springs 14 urge a cassette 2 inserted into the cassette holder 10 with its bottom wall against the lower-wall sections 13 of the cassette holder 10. Two stops project from the lower-wall sections 13 to limit the insertion movement of a cassette 2 into the cassette holder 10.

As is shown in FIG. 2, the cassette holder 10 is movable between a loading position and an operating position, the movement from the loading position into the operating position proceeding along an L-shaped path of movement first parallel and then perpendicularly to the upper wall 12 of this holder. To guide the cassette holder 10 along this L-shaped path of movement a guiding device 17 is arranged between the cassette holder 10 and two guide plates 16 which are stationary in the apparatus 1 and which extend parallel to the side walls 11 of the cassette holder 10. In each guide plate 16 the guiding device 17 has two L-shaped guide slots 18 and 19 defining the L-shaped path of movement. On each side wall 11 of the cassette holder 10 the guiding device 17 further comprises two guide pins 20 and 21 mounted in the side wall 11, the free ends of said pins engaging the guide slots 18 and 19. Each guide slot has an upwardly inclined slot portion at its end which is remote from the front wall 3 in order to enable the cassette holder 10 to be simply inserted into the guide slots 18 and 19 with its guide pins 20 and 21 during mounting of the holder in the apparatus. These slot portions extend up to the upper ends of the guide plates 16 and during mounting of the cassette holder 10 the guide pins 20 and 21 can be inserted simply from the top into the open ends of these slot portions. The movement of the cassette holder 10 is controlled and transmitted via a coupling pin 22, which projects laterally from a tab 23 connected to a lower-wall section 13.

When the cassette holder 10 is in its loading position a cassette 2 can be inserted by hand into the holder 10 until the cassette 2 abuts against the two limiting stops 15. The magnetic tape 24, which extends between two reel hubs provided with flanges, i.e. between two reels 25 and 26 in the cassette 2, is then in an initial position. The cassette 2 is moved to its operating position by a subsequent movement of the cassette holder 10 into its operating position. The cassette holder 10 is supported in its operating position by diagrammatically shown stationary positioning stops 27 and 28 of the apparatus. Likewise, the cassette 2 is then supported in its operating position by diagrammatically shown stationary positioning stops 29 and 30 of the apparatus. In this way the operating position of the cassette holder 10 and the operating position of the cassette 2 are defined.

In the operating position of the cassette 2, as can be seen in FIG. 2, two winding spindles 31 and 32 are in driving engagement with the two reels 25 and 26, of which the winding spindle 31 is shown in dotted lines in FIG. 2. In order to be driven the two winding spindles 31 and 32 are each connected to a drive wheel 33 and 34. For driving these two drive wheels the apparatus 1 comprises a drive system 35, which is shown diagrammatically in FIG. 3 and which comprises a fixed drive wheel 36, which can be driven in opposite directions of rotation by means of a motor and which can drive a pivotable drive wheel 37 which, depending on its direction of rotation, can be brought selectively in driving engagement with one of the two drive wheels 33 and 34, which are in driving engagement with the winding spindles 31 and 32, in order to drive the drive wheel 33 in the direction of rotation indicated by an arrow 33a and the drive wheel 34 in the direction of rotation indicated by an arrow 34a.

Figure 3:
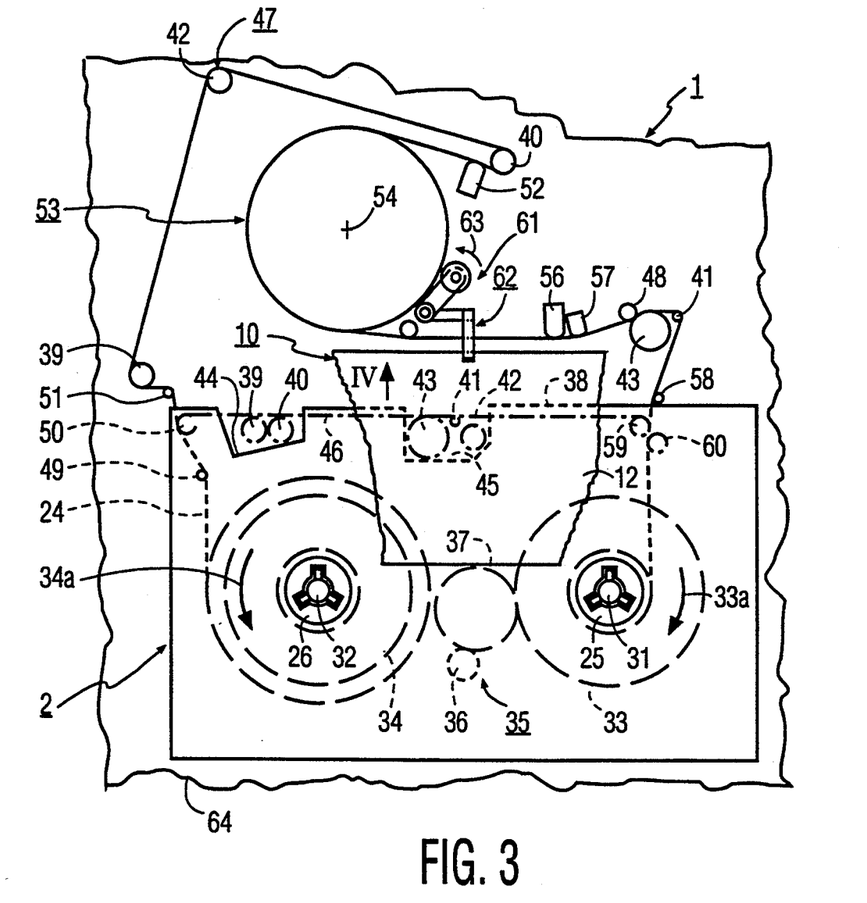
FIG. 3 shows diagrammatically a part of the apparatus shown in FIGS. 1 and 2 to the same scale as in FIG. 2, a cassette contained in the cassette holder being brought into an operating position in the apparatus by means of said holder which has been set to its operating position and the magnetic tape being extracted from the cassette originally containing it by means of a movable tape-threading device and being arranged along a scanning path in which the magnetic tape is wrapped partly around the drum-shaped scanning device.

As a result of the movement of the cassette holder 10 into its operating position the magnetic tape 24 present in a cassette inserted in the cassette holder 10 assumes an intermediate position shown as a dash-dot line in FIGS. 2 and 3. When the cassette 2 is lowered into its operating position a cassette cover, not shown and arranged at the front 38 of the cassette, is opened to expose a cassette opening in the front 38. Moreover, while the cassette 2 is lowered into its operating position four tape guides 39, 40, 41 and 42 and a pressure roller 43, which then occupy the thread-out position shown in dash-dot lines, enter two recesses 44 and 45 of the cassette 2, engaging behind the portion 46 of the magnetic tape 24, which portion is represented by a dash-dot line. The tape guides 39, 40 and 42 are parts of a tape-threading device 47, which is shown only diagrammatically in FIG. 3. For such a tape-threading device reference can be made to AT-PS 384,686, which shows and describes such a tape-threading device in detail, for which reason this tape-threading device 47 will be described only briefly. Therefore, AT-PS 384,686 is herewith incorporated by reference.

The tape-threading device 47 is movable between a thread-out position, for which its parts shown in FIG. 3 are represented in dash-dot lines, and a thread-in position, in which its parts shown in FIG. 3 are represented in solid lines. In the thread-out position of the tape-threading device 47 the tape guides 39, 40 and 41 of this device engage behind the magnetic tape 24, which is in its intermediate position. By moving the tape-threading device 47 to its thread-in position the magnetic tape 24 is threaded along a scanning path to be described in detail hereinafter.

Moreover, during the movement of the tape-threading device 47 to its thread-in position the tape guide 41 is set to its operating position and the pressure roller 43 is set to an intermediate position, not shown in FIG. 3, in the direct proximity of a capstan 48. From its intermediate position the pressure roller 43 is moved to its operating position shown in FIG. 3, in which it presses the magnetic tape 24 against the capstan 48. Since the devices for opening the cassette cover, for actuating the tape guides of the tape-threading device and the pressure roller, and for pressing the pressure roller against the capstan are not relevant to the present invention, they are not shown for the sake of simplicity. Such devices are generally known per se from known apparatuses of this type and for the tape-threading device reference is made again to AT-PS 384,686.

After the tape guides 39, 40 and 42 have been moved to their thread-in positions and the tape guide 41 and the pressure roller 43 have been moved to their operating positions the magnetic tape 24 extends along the scanning path represented as a solid line in FIG. 3. The magnetic tape 24 then extends from the reel 26 to the reel 25 via two tape guides 49 and 50 provided in the cassette, a tape-tension sensor 51, the movable tape guides 39, 42 and 40, a stationary magnetic head 52 for erasing all the signals recorded on the magnetic tape 24, a drum-shaped scanning unit 53, comprising two magnetic heads, not shown in FIG. 3, which are rotatable in a circular path about the axis 54 of the scanning device 53 for recording and reproducing television signals in and from adjoining tracks which are inclined relative to the longitudinal direction of the magnetic tape 24, a stationary tape guide 55, a stationary magnetic head 56 for erasing audio signals in an audio track which extends in the longitudinal direction of the magnetic tape 24, a further stationary magnetic head 57 for recording and reproducing audio signals in the audio track and for recording and reproducing synchronizing signals in a synchronisation track which extends in the longitudinal direction of the magnetic tape 24 and parallel to the audio track, the capstan 48, against which the magnetic tape 24 is pressed by the pressure roller 43, the movable tape guide 41, an stationary tape guide 58, and two further tape guides 59 and 60 provided in the cassette 2. Once the magnetic tape 24 extends along the scanning path just described television signals and audio signals can be recorded or reproduced in known manner.

As indicated diagrammatically in FIG. 3, the apparatus 1 further comprises a head-cleaning device 61 which is movable between a rest position and a cleaning position. The head-cleaning device 61 is loaded towards its rest position by spring means not shown in FIG. 3 and comprises an actuating member 62 via which the head-cleaning device 61 can be moved from its rest position to its cleaning position against the force of the spring means. FIG. 3 shows the head-cleaning device 61 in its rest position. By moving the head-cleaning device 61 in the direction indicated by the arrow 63 it can assume its cleaning position, in which it has been moved towards the path of movement of the magnetic heads of the scanning device 53 and cleans the passing magnetic heads.

The present apparatus has the advantageous feature that the actuating member 62 of the head-cleaning device 61 is arranged and constructed to project into the path of movement of the unit comprising the cassette holder 10 and a cassette 2 which may have been inserted therein, the actuating member 62 moving the head-cleaning device 61 from its rest position into its cleaning position when the cassette holder 10 is moved between its loading position and its operating position. In the present apparatus the actuating member 62 of the head-cleaning device 61 is arranged and constructed in particular to project into the path of movement of the cassette holder 10. The actuating member 62 projects into the path of movement of the upper wall 12 of the cassette holder 10, as will be explained with reference to FIG. 6. As shown in FIG. 3, the apparatus comprises a substantially plate-shaped deck 64 for mounting and supporting all the above-mentioned components of the apparatus.

Figure 4:
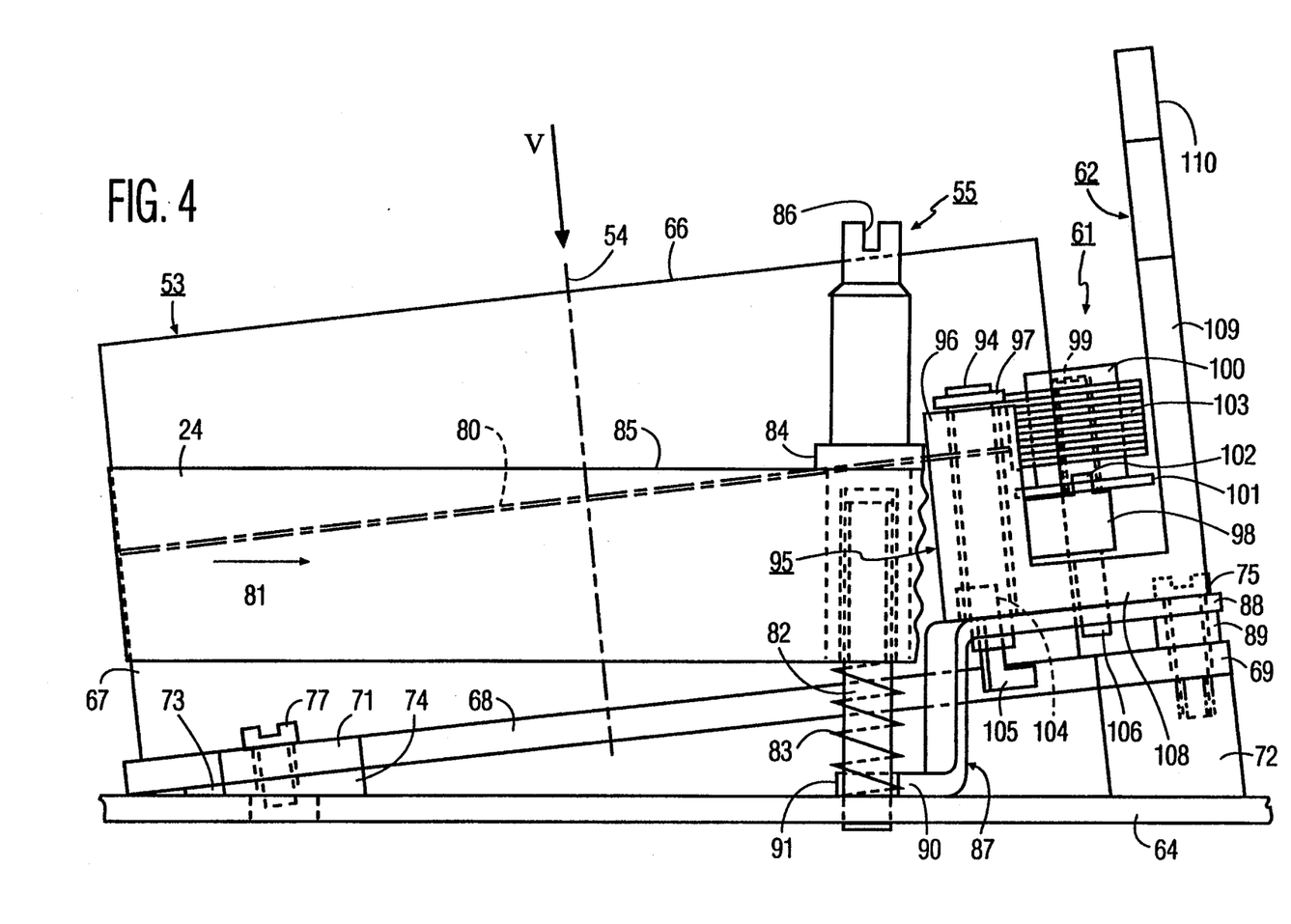
FIG. 4 shows the drum-shaped scanning device and the head-cleaning device of the apparatus shown in FIGS. 1 to 3 in a side view as indicated by the arrow IV in FIG. 3 and to an enlarged scale in comparison with FIG. 3 and to twice its full scale.
Figure 5:
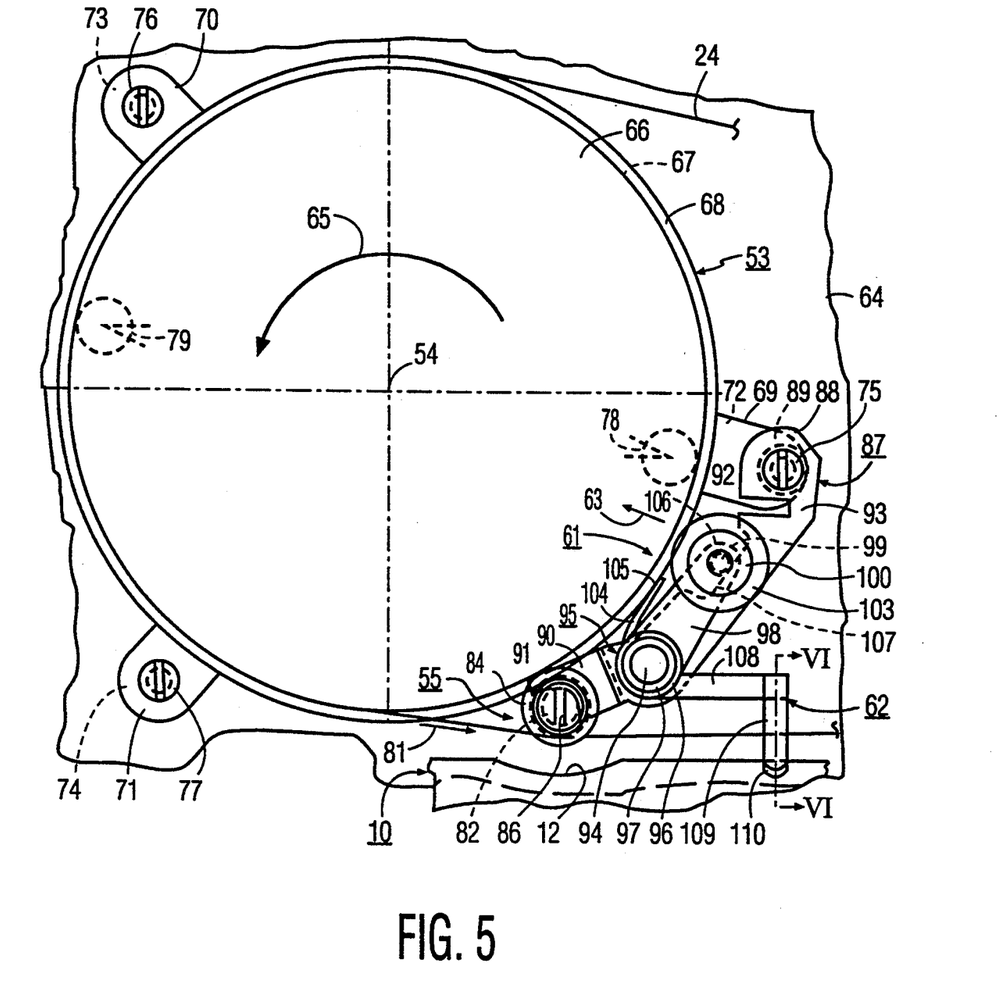
FIG. 5 is a plan view as indicated by the arrow V in FIG. 4 and showing the scanning device and the head-cleaning device of the apparatus shown in FIGS. 1 to 4.

The head-cleaning device 61 will now be described in detail with reference to FIGS. 4 and 5. FIGS. 4 and 5 show the drum-shaped scanning device 53 comprising an upper drum section 66, which is rotatable in the direction indicated by the arrow 65, and a stationary lower drum section 67, which is coaxial with the upper drum section 66. The lower drum section 67 comprises a mounting ring 68 having three radially projecting mounting lugs 69, 70 and 71. By means of these mounting lugs 69, 70 and 71 the drum-shaped scanning device 53 is secured to three wedge-shaped supporting elements 72, 73 and 74, shown diagrammatically in FIG. 4, with the aid of screws 75, 76 and 77, the supporting elements 72, 73 and 74 being connected to the deck plate 74 in a manner not shown. Two magnetic heads 78 and 79, shown diagrammatically in FIG. 5, are connected to the rotatable drum section 66 and through a gap 80 between the two drum sections 66 and 67 they enter into scanning contact with the magnetic tape 24 which is wrapped around a part of the drum-shaped scanning device 53 and moves over said part of the drum-shaped scanning device in the direction indicated by an arrow 81, the magnetic heads 78 and 79 scanning adjoining tracks which are inclined relative to the longitudinal direction of the magnetic tape 24 and thus recording signals on or reproducing signals from the magnetic tape.

FIGS. 4 and 5 further show in detail the stationary tape guide 55 by means of which the part of the magnetic tape 24 which exits the drum-shaped scanning device 53 is guided in the height direction. This tape guide 55 essentially comprises a sleeve screwed onto a mounting pin 82 which is fixed in the deck plate 64, which pin is provided with a pressure spring 83 and has a screw-threaded free end portion. The tape guide 55 has a flange 84 to guide the upper tape edge 85 of the magnetic tape 24 in the height direction. For the height adjustment of the tape guide 55 the free end of this guide has a slot 86 adapted to receive an adjustment tool. For the height adjustment the tape guide 55 is rotated and axially moved relative to the mounting pin 82 by means of the screw-thread, the pressure spring 83 ensuring that there is no lost motion.

FIGS. 4 and 5 also show the head-cleaning device 61 in detail. For supporting the head-cleaning device 61 there is provided a steel member 87 having two offset portions, which at the location of an end portion 88 is secured to the wedge-shaped supporting element 72 by means of the screw 75 with a spacer 89 and the mounting lug 69 interposed. For positioning the member 87 the other end 90 of the member 87, which end has a substantially circularly arcuate recess 91, engages with the mounting pin 82 of the tape guide 55. In the area adjacent the end 88 of the member this member has a recess 92, so that a thinner zone 93 is formed in the member 87, which zone is utilised as bending zone for adjusting the height position of the member 87 and the parts carried by the member 87.

The member 87 carries a stationary steel spindle 94. On this spindle a plastics supporting element 95 is arranged so as to be pivotable about the spindle 94 in the direction indicated by the arrow 63. The supporting element 95 comprises a supporting sleeve 96, which is retained on the spindle 94 by means of a lock washer 97. A supporting arm 98 projects radially from the supporting sleeve 96 and is integral therewith. The free end of the supporting arm 98 carries a further stationary spindle 99 which is integral with the arm 98. The further spindle 99 carries a cup-shaped supporting body 100 having a flange 101 at its end which faces the supporting arm 98, which flange is overlapped by a latching nose 102 projecting from the supporting arm 98, whereby the body 100 is retained on the further spindle 99. The supporting body 100 is rotatable relative to the further spindle 99 and at it circumference it carries a hollow cylindrical cleaning element 103 which is made of felt but which may alternatively be made of a felt-like synthetic or similar material.

Moreover, a thin resilient arm 104 with two offset portions projects from the supporting sleeve 96, which arm is integral with the supporting sleeve 96 and bears against the mounting ring 68 of the scanning device 53 with its free end 105. The resilient arm 104 forms a spring means which urges the head-cleaning device 61 towards its rest position, as can be seen particularly in FIG. 5. In the present apparatus the rest position of the head-cleaning device 61 is defined in that a stop pin 106, which is integral with the supporting arm 98 and which is coaxial with the further spindle 99, is in abutment with a stop surface 107 on the member 87.

As stated hereinbefore, the head-cleaning device 61 comprises an actuating member 62. This actuating member 62 comprises an arm 108, which projects laterally from and is integral with the supporting sleeve 96, which arm is adjoined by an arm 109 which extends substantially in the axial direction of the spindles 94 and 99 and which is resilient because it is made of a plastics. As is shown in FIG. 6 the arm 109 has two offset portions and the free end 110 of the arm 109 is constructed and arranged to project into the path of movement of the upper wall 12 of the cassette holder 10, as is shown diagrammatically in FIG. 6.

Figure 6:
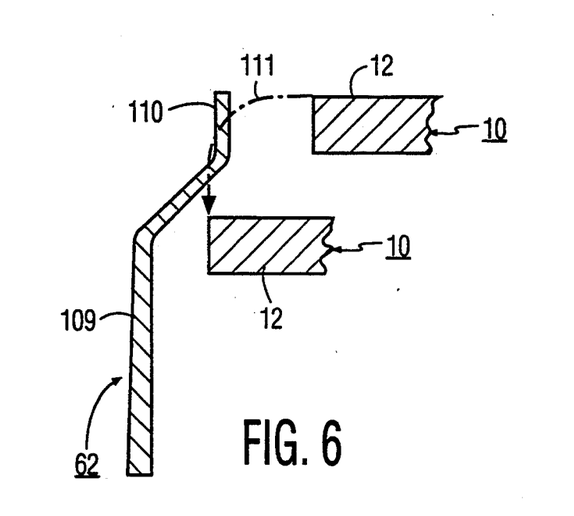
FIG. 6 is a sectional view taken on the line VI—VI in FIG. 5 and showing a part of the apparatus shown in FIGS. 1 to 5, to illustrate the cooperation of a part of the cassette holder with an actuating member of the head-cleaning device.

In this way it is achieved that during each movement of the cassette holder 10 the upper wall 12, whose path of movement is represented diagrammatically as a dash-dot line 111 in FIG. 6, cooperates with the free end 110 of the arm 109 of the actuating member 62, so that the entire head-cleaning device 61 is pivoted in the direction indicated by the arrow 63. As a result of this, the cleaning element 103 is pivoted towards the scanning device 53, causing the cleaning element 103 to be applied to the scanning device 53 at the location of the gap 80 between the two drum sections 66 and 67. In this way it is achieved that the magnetic heads 78 and 79, which rotate in the area of the gap 80 and which are rotated in all operational situations in which the cassette holder 10 is moved, enter into contact with the cleaning element 103 at the location of their head gaps, the cleaning element 103 cleaning the tape-contact faces of the magnetic heads 78 and 79. The movement of the cassette holder 10 causes the head-cleaning device 61 to be set to its cleaning position, in which the cleaning element 103 engages against the scanning device 73, for only some tenths of seconds. However, owing to the relatively high speed of rotation of the magnetic heads 78 and 79 this time is adequate to allow each magnetic head to come several times into contact with the cleaning element 103. When the cleaning device 61 is in its cleaning position the cleaning element 103 engages against the scanning device 53, the cleaning element 103 being also set into rotation via the rotating drum section 66, which has the advantage that always another part of the cleaning element 103 comes into contact with the magnetic heads 78 and 79.

Other constructions are possible within the scope of the invention. For example, for movably supporting a cleaning element a slidable supporting member instead of a pivotable supporting member may be used. Such a construction is particularly advantageous if the head-cleaning device cooperates with the magnetic heads of a drum-shaped scanning device at the side of this scanning device which is remote from an inserted cassette, as is the case in an apparatus in which the magnetic tape is withdrawn from the cassette by means of a tape-threading device comprising two tape-threading guides which follow paths of movement which are mirrorsymmetrical relative to a plane of symmetry perpendicular to the front side of the cassette and substantially containing the axis of the scanning device.

I claim:

1. A head cleaning device for a magnetic tape cassette apparatus having a rotating head comprising;

a rotating head means;

a cassette holder, said cassette holder being moveable between a loading position and an operating position along a predetermined path;

tape threading means for removing the magnetic tape from said magnetic tape cassette and positioning said tape about said rotating head means;

a head cleaning device for cleaning said rotating head means, said head cleaning device being moveable between a rest position and a cleaning position in engagement with said rotating head means;

means for biasing said head cleaning device into its rest position; and head cleaning device actuating means for displacing said head cleaning device from said rest position to said cleaning position, said head cleaning device actuating means being activated by said cassette holder during movement from its loading position to its operating position, said head cleaning device actuating means displacing said head cleaning device into its cleaning position for at least a portion of the movement of said cassette holder means along said predetermined path.

2. The head cleaning device as claimed in claim 1 wherein said head cleaning device is in its cleaning position during the movement of the cassette holder but not at the loading and operating positions of the cassette holder.

3. The head cleaning device as claimed in claim 1 wherein said head cleaning device comprises rotatable means, said rotatable means rotating when said head cleaning device is in engagement with said rotating head means.

* * * * *